United States Patent [19]

Gnatowski

[11] Patent Number: 5,273,787
[45] Date of Patent: Dec. 28, 1993

[54] METHOD OF PROTECTING WOOD SURFACES AND A WOOD PRODUCT PRODUCED THEREBY

[75] Inventor: Marek J. Gnatowski, Coquitlam, Canada

[73] Assignee: MacMillan Bloedel Limited, Vancouver, Canada

[21] Appl. No.: 862,648

[22] Filed: Apr. 3, 1992

[51] Int. Cl.$^5$ .................................................. B05D 1/38
[52] U.S. Cl. .................................... 427/408; 427/317; 427/386; 427/399
[58] Field of Search .............. 427/386, 393, 317, 408, 427/399

[56] References Cited

U.S. PATENT DOCUMENTS

| | | | |
|---|---|---|---|
| 2,375,113 | 5/1945 | Klammt et al. | 427/317 |
| 2,867,543 | 1/1959 | Braun, Jr. | 427/317 |
| 3,166,434 | 1/1965 | Gauger, Jr. | 427/317 |
| 3,242,002 | 3/1966 | Brader, Jr. | 427/386 |
| 3,645,666 | 2/1972 | Bailey et al. | 427/317 |
| 4,057,664 | 11/1977 | Audykowski | 427/426 |
| 4,297,253 | 10/1981 | Sorbier | 427/408 |
| 4,521,495 | 6/1985 | Hahn, Jr. | 427/317 |
| 4,553,982 | 11/1985 | Korbel et al. | 427/214 |
| 4,832,987 | 5/1989 | Ueda et al. | 427/350 |
| 4,908,227 | 3/1990 | Dougherty et al. | 427/517 |
| 4,913,972 | 4/1990 | Grunewalder et al. | 427/303 |
| 5,213,897 | 5/1993 | Baron et al. | 427/386 |

FOREIGN PATENT DOCUMENTS

| | | | |
|---|---|---|---|
| 2602460 | 2/1988 | France | 427/408 |
| 62-221477 | 9/1987 | Japan | 427/408 |
| 1-225502 | 9/1989 | Japan | 427/393 |

Primary Examiner—Terry J. Owens
Assistant Examiner—D. L. Dudash
Attorney, Agent, or Firm—C. A. Rowley

[57] ABSTRACT

A wood product is protectively coated while maintaining the appearance of wood without discoloration by applying to the surface of a dry wood member a sealer coating containing a cyclic epoxy and an anhydride and curing the sealer, while reacting, at least a portion of the epoxy with lignin in the wood and at least a portion of the anhydride with cellulose and lignin in the wood, to bind the sealer to the wood, and cross linking cellulose, followed by applying a protective coating over the sealer before the sealer has been cured completely to bind the protective coating to the sealer. The protective coating provides a barrier to UV penetration and increases the durability of the surface.

15 Claims, 1 Drawing Sheet

METHOD OF PROTECTING WOOD SURFACES AND A WOOD PRODUCT PRODUCED THEREBY

FIELD OF THE INVENTION

The present invention relates to a wood product having improved durability and to a process of making same. More particularly the present invention relates to a wood product having at least one surface sealed by a sealer coating and a protective coating that inhibits the transmission of UV light both of which are substantially transparent.

BACKGROUND OF THE PRESENT INVENTION

The methods commonly used for the protection of wood exposed to exterior conditions usually consist of applying some form of coating, for example an acrylic or alkyd paint which normally is pigmented to provide the decorative color to the surface and to protect the wood against UV radiation.

Generally where a transparent coating is applied such as transparent lacquers, these lacquers do not provide adequate protection to the wood and/or discolor the wood significantly.

The adhesion of the paints of lacquers to the wood is generally via mechanical type bond rather than a chemical bond. This is particularly true of transparent coatings that are designed to attempt to protect the wood while at the same time exposing the natural beauty of the wood. In these cases the adhesion of the protective coating to the wood may deteriorate quickly resulting in an unsightly appearance and exposing the wood.

The use of epoxy resins as binders for gluing wood and the like is well known. The use of epoxy as a coating generally results in a surface having poor weathering characteristics. Similarly the use of epoxy resins for molding objects is also well known. Cycloaliphatic epoxies are normally used to withstand the weather elements and provide a good and durable moulded product but are not associated with coatings for wood.

BRIEF DESCRIPTION OF THE PRESENT INVENTION

The present invention relates to an improved wood product and a method of making it wherein the wood product has one surface clearly visible through a protective coating formed by an underlying sealing coat bonded to the wood and a protective top coat.

Broadly the present invention relates to a method of improving the durability of a surface of wood without significant discoloration of the wood surface comprising applying to said surface of a dried wood member, a transparent sealer coating containing a cycloaliphatic epoxy and an anhydride, said sealer coating being applied under conditions to cause partial curing of said sealer coating and the reaction of at least a portion of the said epoxy with lignin in said wood and at least a portion of said anhydride with cellulose in said wood, applying a transparent protective coating over said sealer coating before said sealer coating has completely cured to bind said protective coating to said sealer, said protective coating containing UV inhibitors and applying heat to complete the cure of said sealer coat and cure said protective coat.

Preferably said surface is preheated before application of said sealer coat.

Preferably said preheating is to a temperature of less than about 120° C.

Preferably said sealer coat is partially cured at temperature of between 80° and 180° C.

Preferably said epoxy resin will contain a cycloaliphatic ring.

Preferably said epoxy will have the formula $C_{14}H_{20}O_6$.

Preferably the anhydride will be a cycloaliphatic, preferably of the formula $C_8H_{10}O_3$.

Preferably the curing of the epoxy resin will be aided by a tertiary amine catalyst of the formula $C_{15}N_3H_{27}O$.

Preferably said cycloaliphatic epoxy resin will have the following structure.

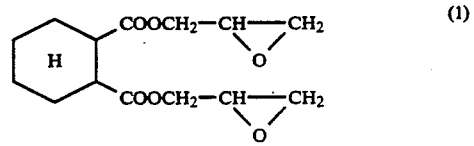

Preferably said cycloaliphatic anhydride will have the structure

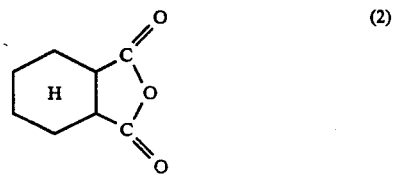

Preferably a catalyst will be used to facilitate the reactions of the sealer coating.

Preferably said catalyst will have the formula $C_{12}N_3H_{27}O$.

Preferably said catalyst will have the structure

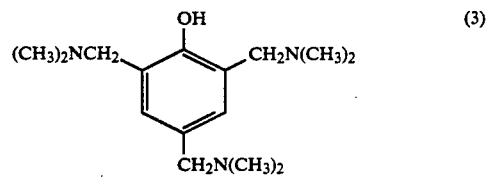

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
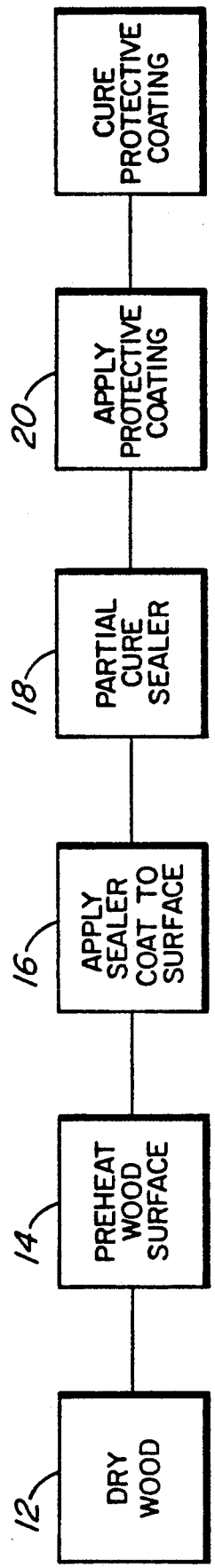
FIG. 1 is a schematic block diagram illustrating the main steps in the method of the present invention.

As schematically illustrated in FIG. 1, the process of the present invention either dries the wood as indicated at 12 or uses dried wood and preferably preheats the wood surface to be treated as indicated at 14 and then applies a sealer coating to the preheated surface as indicated at 16 and partially cures this sealer coat as indicated at 18 by the addition of heat.

The surface to be protected is generally at an elevated temperature (above room temperature) but normally not over about 120° C. when the first or sealer coating as applied as indicated at 16.

The sealer applied in step 16 may be applied in any suitable manner, for example, by spray coating or brush coating or the like and will be formed from a suitably selected weathering resistant epoxy resin, preferably a cycloaliphatic epoxy resin that is transparent and non-chalking and will react with lignin containing phenol groups in the wood and thereby aid in reducing oxidation and discoloration of the wood surface. One suitable cycloaliphatic epoxy resin that has been found very satisfactory for the present invention is illustrated by the following formula $C_{14}H_{20}O_6$.

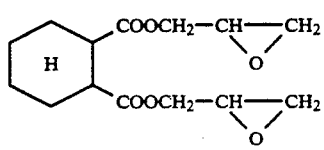

(1)

The sealer coat will preferably include a compatible ultraviolet light (44) shielding material such as a UV screen or absorber, for example, material sold under the trade name Tinuvin 1130. The epoxy resin described above will be used in conjunction with a hardener which will preferably be an anhydride which reacts with the hydroxyl groups of the cellulose. The preferred the anhydride will be a cycloaliphatic anhydride having the formula $C_8H_{10}O_3$.

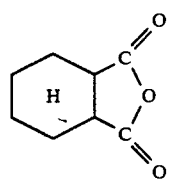

(2)

Sufficient of the anhydride and the epoxy resin will be provided to complete the reaction and harden the epoxy resin taking into consideration the side reactions between the epoxy resins selected and the wood, i.e. the phenol in the lignin of the wood and if applicable, the reaction of the epoxy resin with the hydroxyl groups of the cellulose together with the reaction of the anhydride with the hydroxyl groups of the cellulose.

Applicant has found the ratio of cycloaliphatic epoxy resin to cycloaliphatic anhydride of in order of 0.9 to 1.1 to be effective. However, the best selection of this ratio will depend on the particular wood being treated and should be optimized in any process by empirical observations.

The catalyst selected to catalyze the reaction epoxy group, with anhydride also catalyzes the reactions between the epoxy or the anhydride with the cellulose and lignin and thus selection of a suitable catalyst to obtain the required formation chemical bonding polymeric reaction products to the wood itself is important.

Applicant has found that a suitable catalyst for this purpose is a tertiary amine, in particular applicant has used a tertiary amine of the formula $C_{15}N_3H_{27}O$ with the following structure

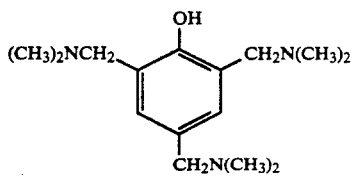

(3)

The sealer coat applied to the surface then is partially cured before the protective coating is applied. It is important not to complete the cure since reaction of the sealer with the protective coating is desirable to improve the bond between the protective coating and the wood via the intermediary of the sealer coat which as above described is chemically bonded to the wood.

The curing of the sealer is controlled by the application of heat as indicated at 18. The application of heat (temperature) and the heating time determines the degree of cure of the sealer coating, it being important to partially cure to obtain the reaction between the anhydride and the cellulose and the epoxy and the phenol groups of the lignin as well as the formation of the epoxy coating or impregnation in the wood. This normally requires heating for a limited time at elevated temperature generally between about 80° and 140° C. For example, curing at 170° C. for a time of 30 minutes (after an initial cure at less than 130° C. for about 15 minutes) has been found satisfactory. The higher the temperature the shorter the time. It is important that the protective coating be applied as indicated at 20 before the curing of the sealer coating is complete so that the protective coating may react effectively with the partially cured sealer coating to bond the two together and provide a stronger bond between the protective coating and the sealer coating and thereby with the wood.

The protective coating has two functions; namely to protect the surface of the wood from physical damage, i.e. weathering, and to shield the wood and sealer coat from damaging radiation such as ultra violet radiation which tends to discolour the wood. The latter feature may be obtained by incorporating UV absorbers or UV screens in the protective coating (and in the sealer coating) to help prevent the penetration of the UV light to the wood.

The first requirement, namely to protect the wood itself, may be obtained by selecting a suitable resin having a hardness or toughness that will provide the required degree of protection.

Applicant has found that the use of essentially the same epoxy resin with cycloaliphatic ring used for the sealer coating suitably modified with UV screens or absorbers will provide a very effective protective coat that when containing the required UV absorbers or reflectors will have the required transparency to expose the natural surface of the wood assuming the UV absorbers and/or screens are properly selected and incorporated in the normal amounts using conventional practice.

The coated element—particularly the two coatings are then heated to about 180° C. to complete the cure of the resin. The higher the temperature the more rapid the cure, however there is a strong tendency for anhydride to vaporize at the higher temperature and therefore it is sometimes desirable to commence the cure at a low temperature of about 70°–120° C. until the anhydride is bound and then complete the cure at the higher temperatures above 130° C., i.e. between about 130° and 180° C. for the requisite time.

It is believed that other epoxy resins having cycloaliphatic rings including hydrogenated bisphenol resins will also be satisfactory for use as both the sealing coating and the protective coating or both, such as

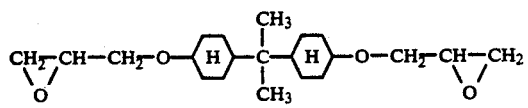

or triglycidyl isocyanate having the formula

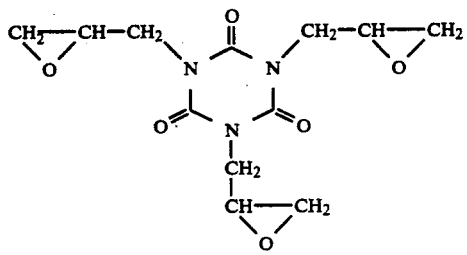

Other accelerators or catalysts that probably would be effective include tertiary amine type by Rohm & Haas sold under the trademark DMP-30, or a boron trichloride-amine complex sold by Ciba Geigy under the tradename DY 9577 or an organometallic amine combination also sold by Ciba Geigy under the trade designation DY 067 or substituted thiourea and sold by Poly Organix under the trade designation Curimid PTI, or 1-(2-hydroxypropyl) imidaxole sold by Poly Organix Inc. under the trade designation Curimid HEI.

Other coatings may be used as a protective provided it has the properties referred to above and chemically bonds with the sealing coat.

Figure 2:
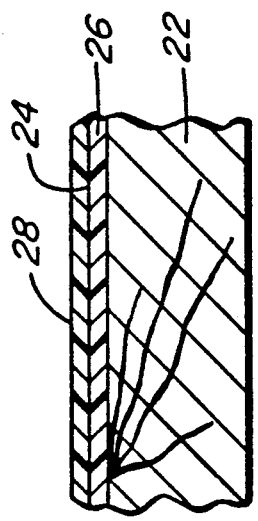
FIG. 2 is a cross section through a wood element coated in accordance with the present invention.

FIG. 2 shows a wood element 22 having its upper surface 24 impregnated with a first coating or sealer as indicated at 26 bound thereto via both a mechanical and a chemical bond between the coating and lignin and the cellulose of the wood and with a protective coating 28 overlying the coating 26 on the surface 24 and bonded to the surface and to the sealing coat or layer 26.

EXAMPLE

A mixture was prepared which included 100 parts by weight of epoxy resin having the formula $C_{14}H_{20}O_6$ (Araldite 184 sold by Ciba Geigy), 90 parts per weight of an anhydride of the formula $C_8H_{10}O_3$ (Araldite HY-907 sold by Ciba Geigy), 3 parts by weight tertiary amine catalyst having the formula $C_{15}N_3H_{27}O$ (DMP-30 sold by Rohm and Haas) and 3 parts by weight of UV absorber (Tinuvin 1130 sold by Ciba Geigy).

Selected western cedar panels with 4% moisture content were preheated to 90° C. and the above coating was applied to the hot wood surface in quantities of about 5-8 grams per square foot to provide a sealer coating. The panels were cured at 130° C. for 15 minutes and a second coat of the same coating material was applied to achieve a total coating coverage ranging from about 8 to 12 grams per square foot. After a preliminary cure at 130° C. for 15 minutes the coating was post-cured at 170° C. for an additional 30 minutes to complete the cure.

Accelerated weathering tests were performed using Atlas Weatherometer with twin carbon arc lamps. Test cycle involved continuous light with water washing the specimens every 2 hours for 20 min at temperature 60° C.

| Type of Coating | Exposure time (h) | | | | | |
|---|---|---|---|---|---|---|
| | 400 | 700 | 1000 | 1100 | 1500 | 3200 |
| Present Invention | No change | No change | Acceptable (about 5%*) | — | >30% | >75% |
| Oil Alkyd | >50% | | | | | |
| | No change | No change | | >50% | | |
| Urethane mod. alkyd | No change | No change | >30% | | | |

*% means % of surface area degraded

After 3200 hours of exposure, the sample coated with the coating of the present invention showed high gloss and good adhesion to wood. Deterioration appeared as a whitening of wood below the coating surface and cracking of wood damaged by UV. The other coatings all show loss of adhesion during weathering.

It will be apparent that the above described systems are essentially solvent free which provides a further advantage. It is, however, to be understood that in some instances, e.g. to obtain deeper penetration, it may be desirable to employ a minor amount of solvent.

Based on incomplete experimental results it is expected that Curimid-PTC from Poly Organix Inc. may perform better as the catalyst.

Having described the invention, modifications will be evident to those skilled in the art without departing from the spirit of the invention as defined in the appended claims.

I claim:

1. A method of protectively coating a surface of wood while maintaining the appearance of the wood without significant discoloration comprising applying to said surface of a dry wood member, a transparent sealer coating consisting essentially of an epoxy resin having at least one cycloaliphatic ring, a cyanurate ring or an isocyanurate ring plus an anhydride, partially curing said sealer coating to cause the reaction of at least a portion of the said epoxy with lignin in said wood and at least a portion of said anhydride with cellulose in said wood, applying a transparent protective coating over said sealer coating before said sealer coating has completely cured to bind said protective coating to said sealer coating, said protective coating containing UV inhibitors so that said sealer coating and said wood are protected from UV light.

2. A method as defined in claim 1 wherein said surface is preheated to a temperature of less than 120° C. before application of said sealer coating.

3. A method as defined in claim 1 wherein said sealer coat is cured at temperature of between 70° and 180° C.

4. A method as defined in claim 2 wherein said sealer coat is cured at temperature of between 70° and 180° C.

5. A method as defined in claim 1 wherein said protective coating is epoxy resin having at least one of cycloaliphatic, cyanurate or isocyanurate ring.

6. A method as defined in claim 2 wherein said protective coating is epoxy resin having at least one of cycloaliphatic, cyanurate or isocyanurate ring.

7. A method as defined in claim 1 wherein said epoxy has the formula $C_{16}H_{26}O_6$.

8. A method as defined in claim 2 wherein said epoxy has the formula $C_{16}H_{26}O_6$.

9. A method as defined in claim 1 wherein said anhydride contains a cycloaliphatic ring in its structure.

10. A method as defined in claim 2 wherein said anhydride contains a cycloaliphatic ring in its structure.

11. A method as defined in claim 4 wherein said anhydride contains a cycloaliphatic ring in its structure.

12. A method as defined in claim 6 wherein said anhydride contains a cycloaliphatic in its structure.

13. A method as defined in claim 8 wherein said anhydride has the formula $C_8H_{10}O_3$.

14. A method as defined in claim 7 when said epoxy has the structure

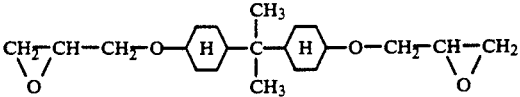

15. A method as defined in claim 8 when said epoxy has the structure

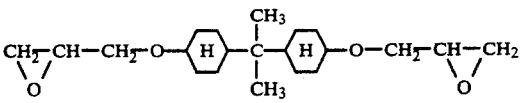

* * * * *